United States Patent
Miyagi et al.

(10) Patent No.: US 7,466,453 B2
(45) Date of Patent: Dec. 16, 2008

(54) IMAGE PROCESSING APPARATUS

(75) Inventors: Noriko Miyagi, Tokyo (JP); Satoshi Ouchi, Tokyo (JP)

(73) Assignee: Ricoh Company Ltd., Tokyo (JP)

( * ) Notice: Subject to any disclaimer, the term of this patent is extended or adjusted under 35 U.S.C. 154(b) by 964 days.

(21) Appl. No.: 10/238,784

(22) Filed: Sep. 11, 2002

(65) Prior Publication Data

US 2003/0058465 A1 Mar. 27, 2003

(30) Foreign Application Priority Data

Sep. 21, 2001 (JP) ............................. 2001-289913

(51) Int. Cl.
G06K 15/00 (2006.01)
H04N 1/40 (2006.01)
(52) U.S. Cl. ...................... 358/2.1; 358/3.21
(58) Field of Classification Search .................. 358/1.9, 358/2.1, 3.21; 382/176
See application file for complete search history.

(56) References Cited

U.S. PATENT DOCUMENTS

| | | | |
|---|---|---|---|
| 5,025,481 A | 6/1991 | Ohuchi | |
| 5,050,227 A * | 9/1991 | Furusawa et al. | 382/269 |
| 5,134,666 A | 7/1992 | Imao et al. | |
| 5,134,667 A * | 7/1992 | Suzuki | 382/164 |
| 5,148,495 A | 9/1992 | Imao et al. | |
| 5,165,072 A * | 11/1992 | Kurita et al. | 358/448 |
| 5,311,332 A | 5/1994 | Imao et al. | |
| 5,418,899 A | 5/1995 | Aoki et al. | |
| 5,420,938 A * | 5/1995 | Funada et al. | 382/173 |
| 5,436,739 A | 7/1995 | Imao et al. | |
| 5,541,742 A | 7/1996 | Imao et al. | |
| 5,617,485 A | 4/1997 | Ohuchi et al. | |
| 5,659,406 A | 8/1997 | Imao et al. | |
| 5,784,488 A * | 7/1998 | Kuwata | 382/176 |
| 5,825,937 A | 10/1998 | Ohuchi et al. | |
| 5,850,298 A | 12/1998 | Narahara et al. | |
| 5,911,004 A | 6/1999 | Ohuchi et al. | |
| 6,049,635 A * | 4/2000 | Hayashi et al. | 382/266 |
| 6,259,813 B1 | 7/2001 | Ouchi | |
| 6,411,733 B1 * | 6/2002 | Saund | 382/190 |
| 6,480,623 B1 | 11/2002 | Yagishita et al. | |
| RE37,940 E | 12/2002 | Imao et al. | |
| 6,901,170 B1 * | 5/2005 | Terada et al. | 382/260 |

FOREIGN PATENT DOCUMENTS

JP 10-173916 6/1998

OTHER PUBLICATIONS

U.S. Appl. No. 10/096,823, filed Nov. 21, 2002, Hirano et al.

* cited by examiner

*Primary Examiner*—Edward L Coles
*Assistant Examiner*—James A. Thompson
(74) *Attorney, Agent, or Firm*—Dickstein Shapiro LLP

(57) ABSTRACT

An edge area is detected from an image as a first characteristic. It is possible that the first characteristic can not be detected. An edge is detected from the image as a second characteristic. The second characteristic is expanded. When the first characteristic is detected, the first characteristic is set as a third characteristic. When the first characteristic is can not be detected, the second characteristic is set as the third characteristic. Processing such as ink generating/under-color removing or intermediate tone processing or gamma correction is performed based on the third characteristic.

7 Claims, 12 Drawing Sheets

FIG. 1 INPUT IMAGE 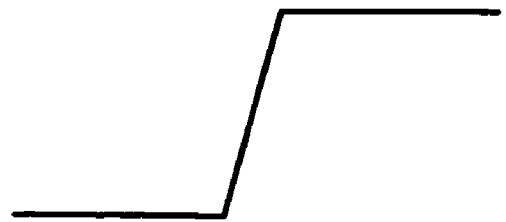
[2] CHARACTERISTIC (BINARY INFORMATION) 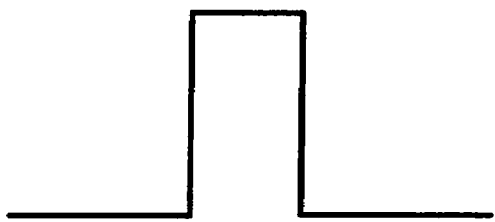
[3] K 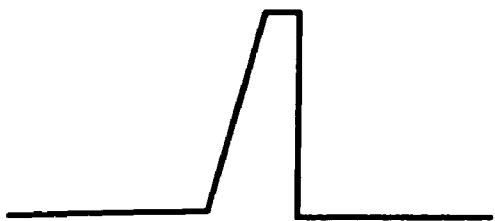
[4] CMY 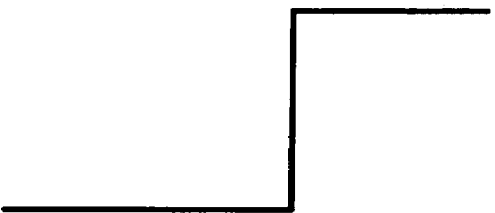
[5] CMYK 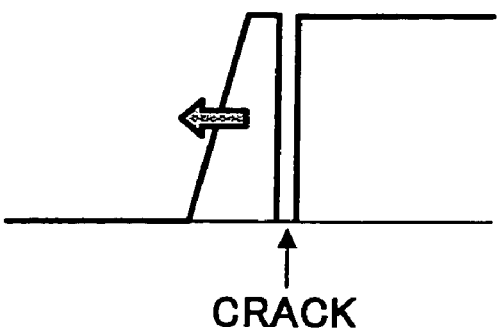
CRACK

FIG. 2 INPUT IMAGE 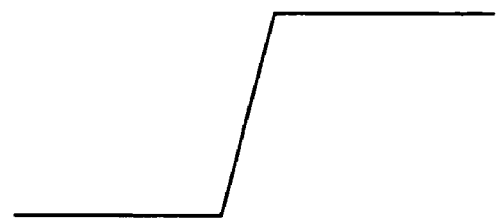
[2] CHARACTERISTIC (MULTI-VALUE INFORMATION) 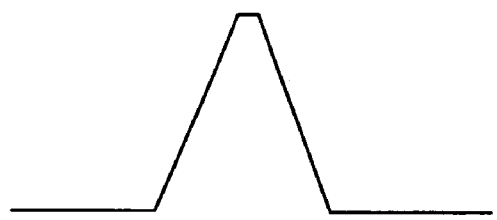
[3] K 
[4] CMY 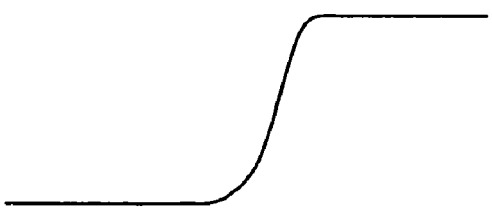
[5] CMYK 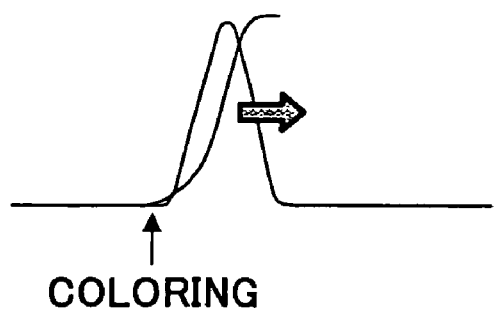
COLORING

FIG. 3 INPUT IMAGE
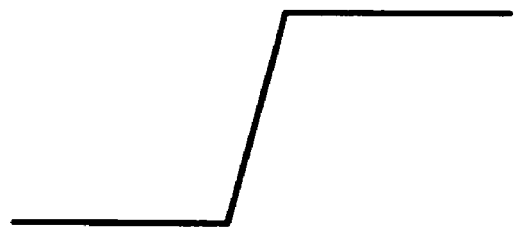
[2] CHARACTERISTIC
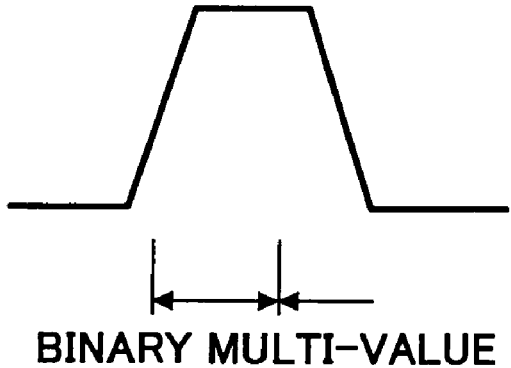
BINARY MULTI-VALUE

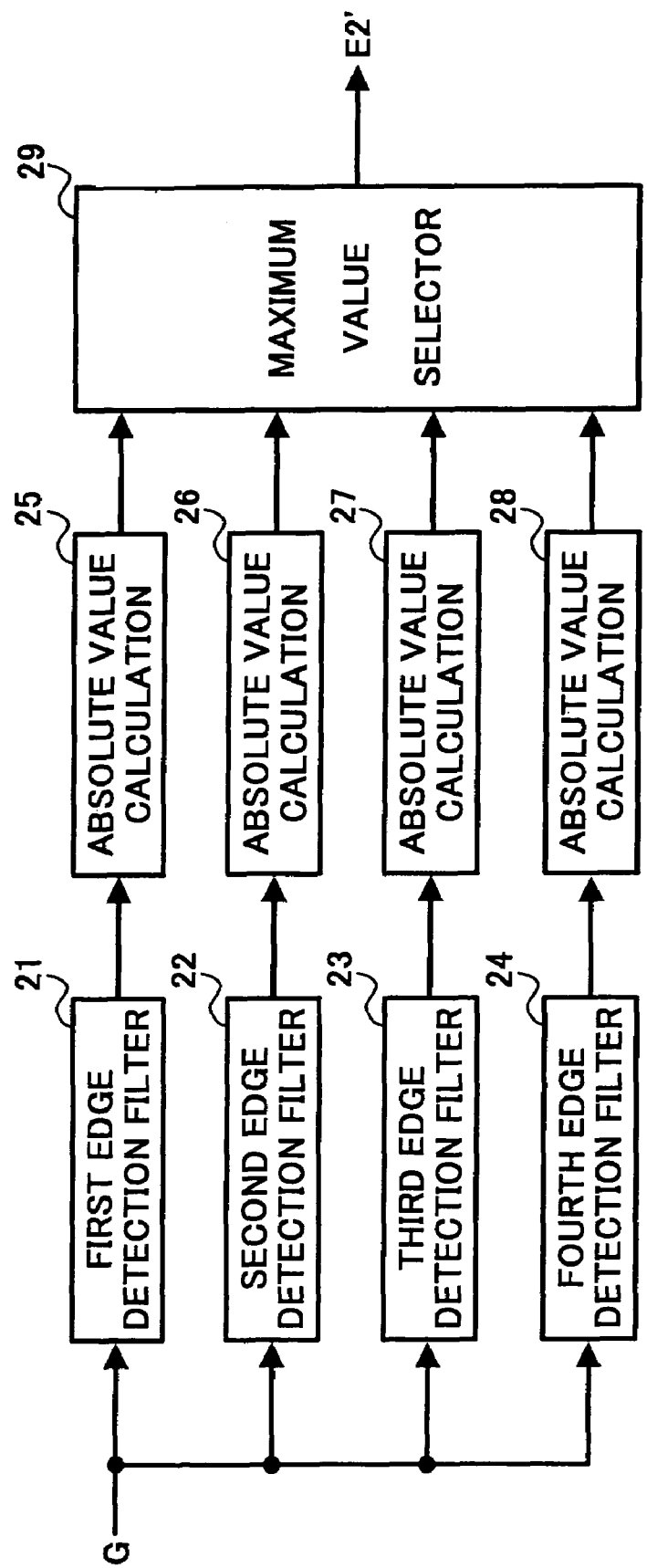

FIG. 6A

| -1 | -1 | -1 | 0 | 1 | 1 | 1 |
|---|---|---|---|---|---|---|
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |
| -1 | -1 | -1 | 0 | 1 | 1 | 1 |

FIG. 6B

| -1 | -1 | -1 | -1 | -1 | -1 | -1 |
|---|---|---|---|---|---|---|
| -1 | -1 | -1 | -1 | -1 | -1 | -1 |
| -1 | -1 | -1 | -1 | -1 | -1 | -1 |
| 0 | 0 | 0 | 0 | 0 | 0 | 0 |
| 1 | 1 | 1 | 1 | 1 | 1 | 1 |
| 1 | 1 | 1 | 1 | 1 | 1 | 1 |
| 1 | 1 | 1 | 1 | 1 | 1 | 1 |

FIG. 6C

| 0 | 1 | 1 | 1 | 1 | 1 | 1 |
|---|---|---|---|---|---|---|
| -1 | 0 | 1 | 1 | 1 | 1 | 1 |
| -1 | -1 | 0 | 1 | 1 | 1 | 1 |
| -1 | -1 | 0 | 0 | 1 | 1 | 1 |
| -1 | -1 | -1 | -1 | 0 | 1 | 1 |
| -1 | -1 | -1 | -1 | -1 | 0 | 1 |
| -1 | -1 | -1 | -1 | -1 | -1 | 0 |

FIG. 6D

| 1 | 1 | 1 | 1 | 1 | 1 | 0 |
|---|---|---|---|---|---|---|
| 1 | 1 | 1 | 1 | 1 | 0 | -1 |
| 1 | 1 | 1 | 1 | 0 | -1 | -1 |
| 1 | 1 | 1 | 0 | -1 | -1 | -1 |
| 1 | 1 | 0 | -1 | -1 | -1 | -1 |
| 1 | 0 | -1 | -1 | -1 | -1 | -1 |
| 0 | -1 | -1 | -1 | -1 | -1 | -1 |

FIG. 7 INPUT IMAGE
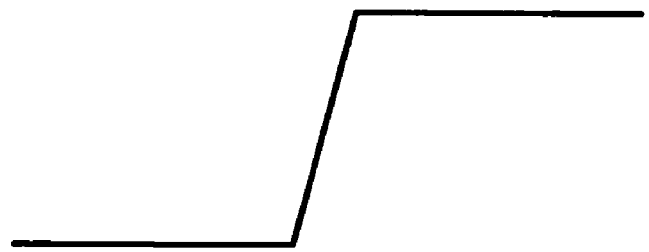
[2] E1
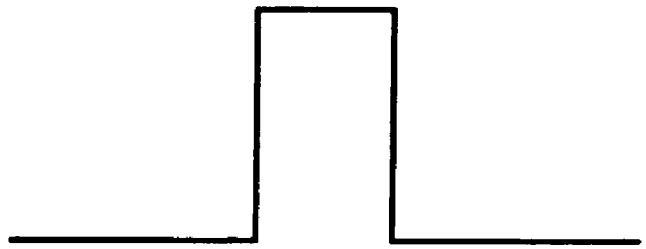
[3] E2'
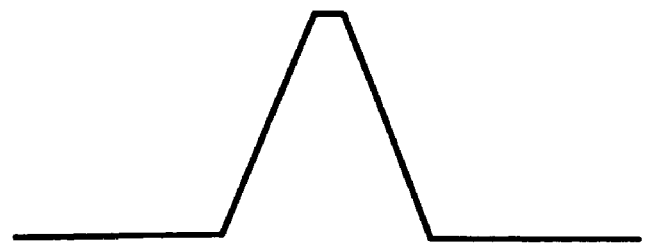
[4] E3'
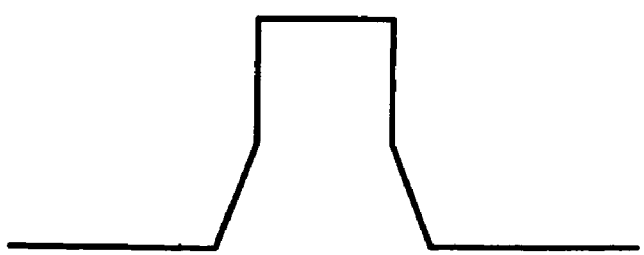

[1] INPUT IMAGE

[2] E1

[3] E2

[4] E3

[1] INPUT IMAGE

[2] E1

[3] E2

[4] E3

[1] INPUT IMAGE

[4] E3'

[5] E3

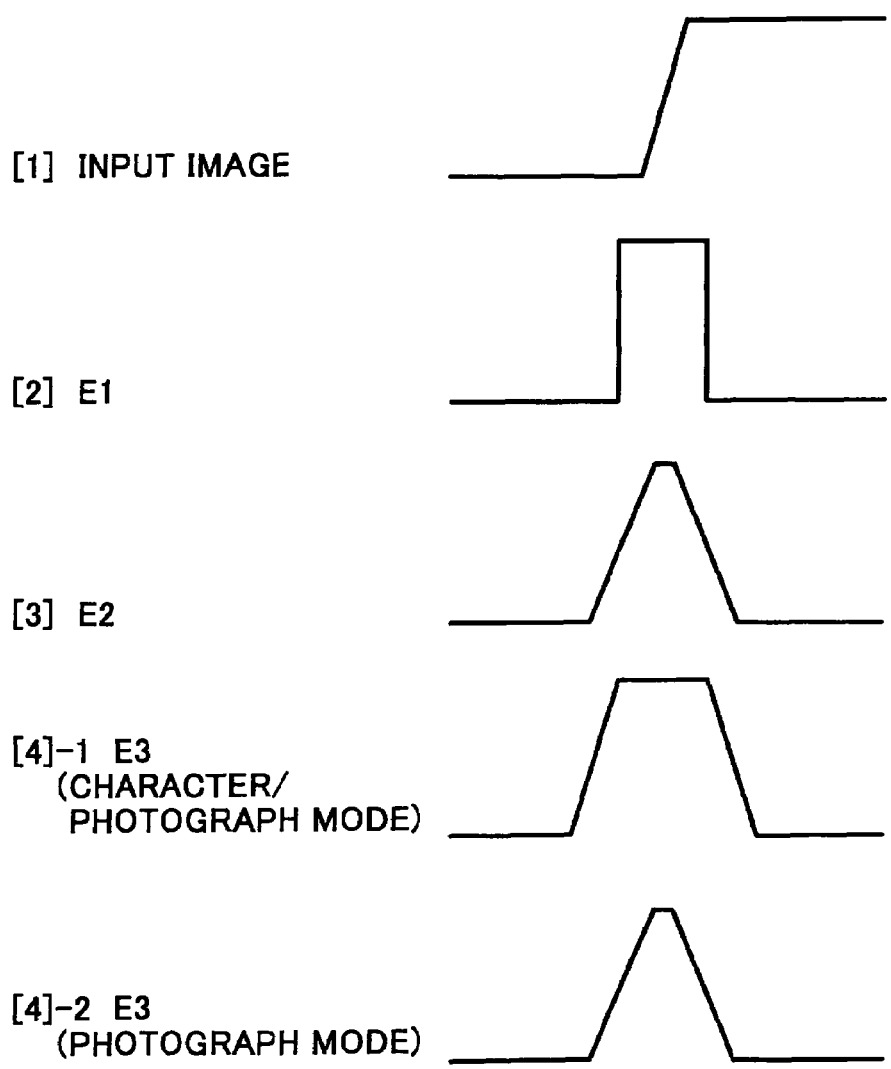

IMAGE PROCESSING APPARATUS

BACKGROUND OF THE INVENTION

1) Field of the Invention

The present invention relates to an image processing apparatus, such as a copying machine, a printer, a facsimile, that detects an edge of an image, and carries out an optimum processing to an edge portion.

2) Description of the Related Art

Conventionally, a digital color image processing apparatus like a digital color copying machine first reads, with a scanner, R (red), G (green), and B (blue) signals of a draft as reflectance data. The digital color image processing apparatus then carries out a color processing that includes a conversion processing for converting the reflectance data into a concentration value, and color correction/ink generation/under-color removal (UCR) processing. In this process, the digital color image processing apparatus converts the data into image data corresponding to four color recording materials including C (cyan), M (magenta), Y (yellow), and K (black), and carries out a pseudo intermediate tone processing, and a gamma processing. Finally, the digital color image processing apparatus outputs a reproduced image from a printer.

However, when there are both the characters and the pictures, it is necessary to carry out different appropriate processing to the characters and to pictures. There is know an apparatus that identifies different characters at various positions of an image, and controls the processing by using identification signals.

As the identification processing, there is an image area separation processing. The image area separation processing is a processing of making reference to an image in a relatively large area, and detecting a black character edge, a color character edge, and a picture area. The digital color image processing apparatus controls the processing based on a result of the image area separation processing. In general, a result of an image area separation processing is produced as binary information of 0 and 1. Therefore, a defect could easily occur due to a rapid changeover of a processing. Problems of the conventional processing will be explained taking the ink generation and UCR processing as examples. In the ink generation processing, a K signal is generated from C, M and Y signals. In the under-color removal processing, a quantity corresponding to the K signal (under-color removal quantity K') is subtracted from the C, M and Y signals.

In FIG. 1 shows a case in which a black character edge of a relatively low concentration ([1]) is an input image. A K single color is reproduced for a portion ([2]) that is decided as a black character edge in the image area separation processing. An inside portion of a character that is not a black character edge is reproduced in CMY (K and CMY become signals of [3] and [4] respectively). The purpose of reproducing the character edge portion in a single K color is to prevent the coloring around the character. The reason for reproducing CMY is because the use of the K signal increases the granular feeling which is not desirable in the picture highlight, although the same ink generation processing is carried out for the inside portion of the character and the picture portion. However, when the K signal is color deviated to the left and this is printed by the printer as shown in [5], for example, a gap is generated at the boundary, and a "crack" occurs. A phenomenon that white of the paper appears in the gap spoils the view, and this is a large defect. Therefore, the image area separation processing has a basic problem of a defect when the separation is in error.

An apparatus that carries out identification, other than the image area separation processing, has been disclosed in Japanese Patent Application Publication No. H7-108019, for example. This apparatus controls the under-color removal quantity at multi-stages according to the edge and the black component. When the black generation and the UCR are controlled at multi-stages by expressing the characteristics in multi-values, there are the following merits and demerits.

FIG. 2 shows an example in which a gray low concentration character edge is used as an input image ([1]) The control is at multi-stages using multi-value characteristics ([2]) . K and CMY change smoothly as shown in [3] and [4] respectively. Therefore, a crack that occurs in the control based on binary information shown in FIG. 1 does not occur unless an extreme color deviation occurs. However, when the K signal deviates to the right as shown in [5], a "coloring" occurs at the outside of the character edge. When there is a large color deviation at the time of inputting an image from the scanner or when the MTF characteristic is poor, a remarkable coloring occurs particularly in a thin line.

There is also know an apparatus that uses an adaptive processing of both the image area separation of binary control and the multi-stage control (for example, an apparatus as described in Japanese Patent Application Laid-Open No. 10-173916). From the viewpoint of the defect due to an erroneous separation, this apparatus carries out an adaptive processing to low-point fine polygonal characters that cannot be easily decided by the separation. Based on this, the image quality is corrected.

However, the adaptive processing of the above apparatus functions only as an assistant to character edges for which the image area separation processing does not work. This apparatus does not solve the problem of the "crack" that occurs at the character edge portions for which the image area separation processing works.

SUMMARY OF THE INVENTION

It is an object of this invention to provide an image processing apparatus that controls a predetermined processing based on characters that take advantage of both the merit of a multi-stage control of adaptive processing that no "crack" occurs and the merit of a binary control of the image area separation processing that no "coloring" occurs.

The image processing apparatus according to one aspect of the present invention comprises a first characteristic detection unit that detects a first characteristic as binary information from an image and a second characteristic detection unit that detects a second characteristic as N value information, where N is an integer equal to or greater than two, from the image. A third characteristic detection unit detects a third characteristic based on the first characteristic and the second characteristic. A control unit provides a control to perform a specified processing to the image using the third characteristic.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 1 is a diagram which explains how and why a crack occurs in the conventional technique, FIG. 2 is a diagram which explains how and why coloring occurs in the conventional technique, FIG. 3 shows characteristics generated by the present invention, FIG. 5 shows a structure for detecting an edge, FIGS. 6A to 6D show the edge detection filter, FIG. 7 shows a third characteristic when a second characteristic is not expanded, FIG. 12 shows the smoothing filter, FIG. 13 shows a third characteristic relating to a fourth embodiment.

DETAILED DESCRIPTIONS

The embodiments of the present invention will be explained in detail below while referring to the accompanying drawings.

Figure 4:
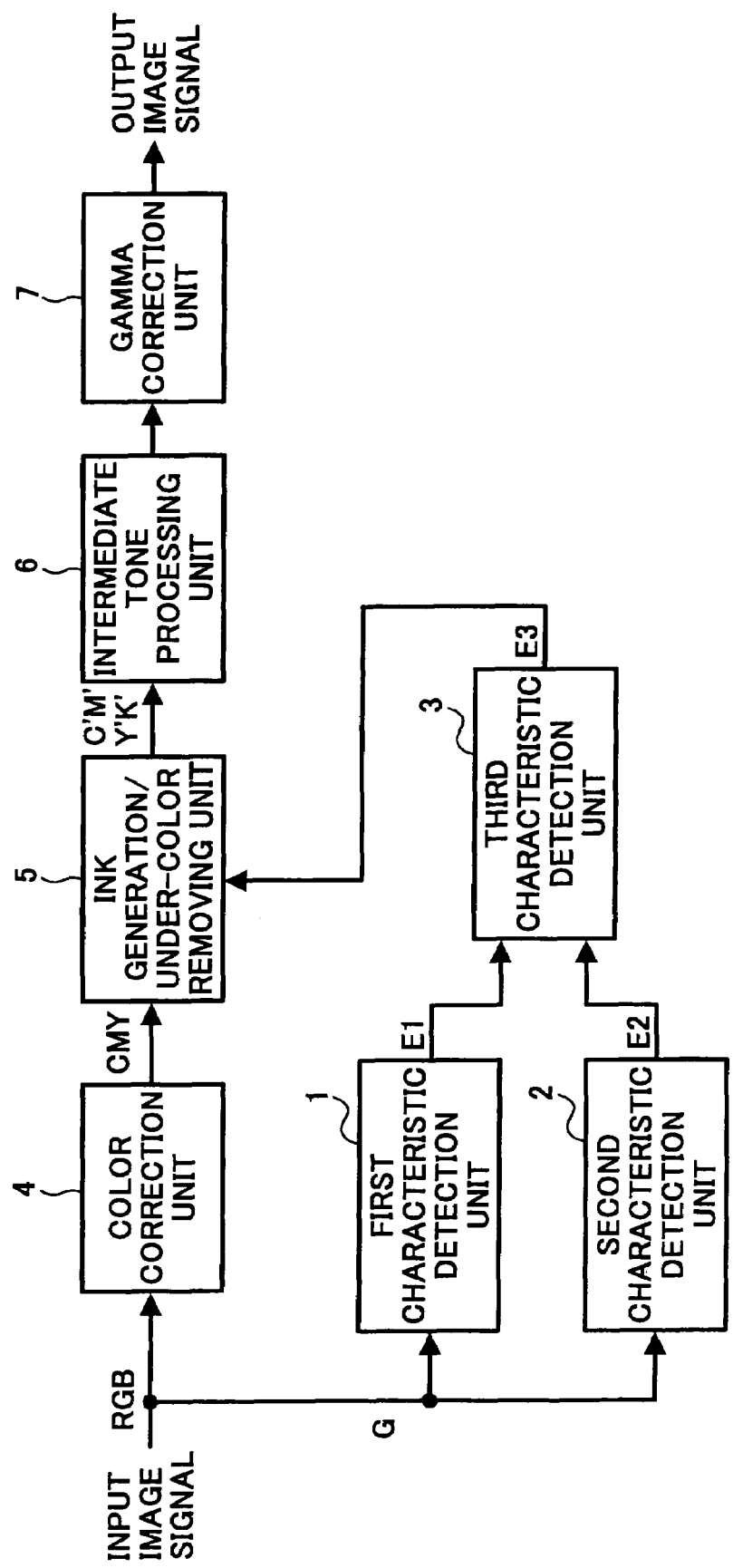
FIG. 4 shows a block diagram of the device according to a first embodiment of the present invention.

FIG. 4 shows a block diagram of the device according to a first embodiment of the present invention. An input image, which is a RGB signal, is obtained via a not shown interface. A color scanner, for example, acquires the input image. The input image may be acquired through a network. It is assumed that zero represents white and 225 represents black in concentration signals (0 to 255) that have been converted from luminance signals.

A first characteristic detection unit 1 and a second characteristic detection unit 2 detect a first characteristic E1 and a second characteristic E2 respectively by using a G signal out of the input image signal RGB. The first characteristic detection unit 1 and the second characteristic detection unit 2 may detect the characteristics by using a brightness signal obtained from a Max (R, G, B) signal or a RGB signal instead of the above G signal.

A third characteristic detection unit 3 detects a third characteristic E3 from the first characteristic and the second characteristic, and controls an ink generating/under-color removing unit 5 based on this third characteristic E3. The first characteristic E1 is an edge area obtained according to an image area separation processing and the second characteristic E2 is an edge.

The edge area may be detected using the 4.2 edge area detection method described in "An image area separation system of an image having a mixture of characters/pictures (dots and photographs" (refer to the paper of The Institute of Electronics, Information and Communication Engineers, Vol. J75-DII No. 1 pp. 39-47, January 1992). According to this method, after the input image data has been edge emphasized, the data is changed into a three-value data using two kinds of fixed threshold values. After the data has been changed into the three-value data, continuity of black pixels and white pixels is detected according to a pattern matching. When both black continuous pixels and white continuous pixels exist in at least one block of 5×5 pixels, this block is decided as an edge area. Other blocks are decided as non-edge areas. An edge area decision signal E1 is a one-bit signal of 1 when the area is an edge area, and is a one-bit signal of 0 when the area is a non-edge area.

The edge detection is achieved according to a block diagram shown in FIG. 5, for example. A first edge detection filter 21, a second edge detection filter 22, a third edge detection filter 23, and a fourth edge detection filter 24 shown in FIG. 5 carry out a masking processing by using four kinds of 7×7 filters in a vertical direction, a lateral direction and a slanted direction as shown in FIGS. 6A to 6D respectively. A maximum value selector 29 selects a block having a largest absolute value among absolute values (25 to 28) of four outputs, and outputs this block as an edge E2'. The edge signal E2' is an eight-bit signal of 0 to 255 (larger the value, the more likely to an edge). This bit width may be in a small number of bits when there is no defect in the image quality.

Figure 8:
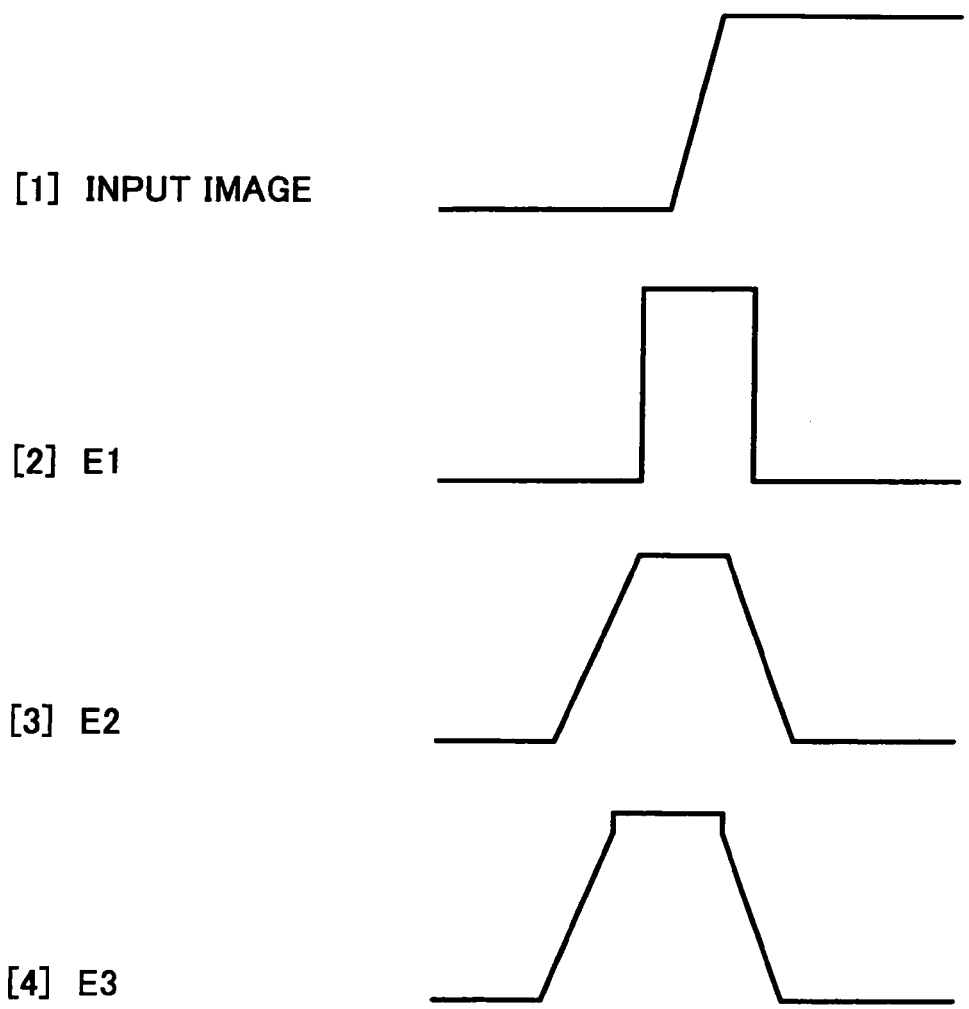
FIG. 8 shows a third characteristic when a second characteristic is expanded.
Figure 9:
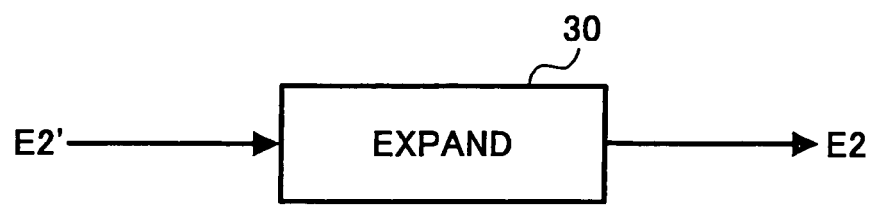
FIG. 9 shows a structure of the expansion processor.

FIG. 8 shows first to third characteristics. In FIG. 8, [4] is a third characteristic E3. Prior to the detection of the third characteristic, the second characteristic detection unit 2 includes an expansion processor 30 (see FIG. 9) that carries out the expansion processing of the edge signal E2' to obtain the E2 signal. The expansion processing is carried out such that a maximum value of E2' in 5×5 pixels around a focused pixel is set as the value of E2 of the focused pixel. It is possible to adjust the expansion quantity by changing the size of reference pixels. The expansion quantity becomes larger when the size of the reference pixels is larger than 5×5.

The third characteristic E3 is detected from the first characteristic E1 and the second characteristic E2 using the following expressions:

$$E3=255: \text{when } E1=1$$

$$E3=E2: \text{when } E1=0$$

The third characteristic detection unit 3 selects E1, that is 255, when E1=1 (255), and selects E2 when E1=0.

When the above calculation expressions are applied without expanding the second characteristic, the third characteristic becomes a discontinuous characteristic having a large jump as shown in FIG. 7. Therefore, an image defect occurs.

The ink generating/under-color removing unit 5 controls at multi-stages the K signal for generating the ink and the K' signal for removing the under-color respectively, based on the third characteristic. In other words, the ink generating/under-color removing unit 5 maximizes the K signal for generating the ink and the K' signal for removing the under-color respectively, when the third characteristic is maximum. The ink generating/under-color removing unit 5 controls K and K' to become smaller respectively, when the third characteristic becomes smaller. Further, when the ink generating/under-color removing unit 5 carries out a multi-stage control including the decolorizing processing based on the third characteristic, this is effective to restrict coloring and restrict the occurrence of defects.

The functions of the intermediate tone processing unit 6 will be explained in connection to a fifth embodiment (FIG. 14) and the gamma correction unit 7 will be explained in connection to a sixth embodiment (FIG. 15) in detail later.

As explained above, according to the present embodiment, it is possible to detect the third characteristic of substantially eight bits having no large jump, when the expansion of the second characteristic is suitably adjusted. Further, when E1=1, E3 takes a maximum value (255), and the binary information of the image separation processing is prioritized. Therefore, it is also possible to maintain the effect of control according to the binary information. By applying the third characteristic to the ink generation and the under-color removal, it is possible to obtain both the effect of the binary information that coloring is restricted and the effect of multi-value information that the occurrence of a crack is restricted.

Figure 10:
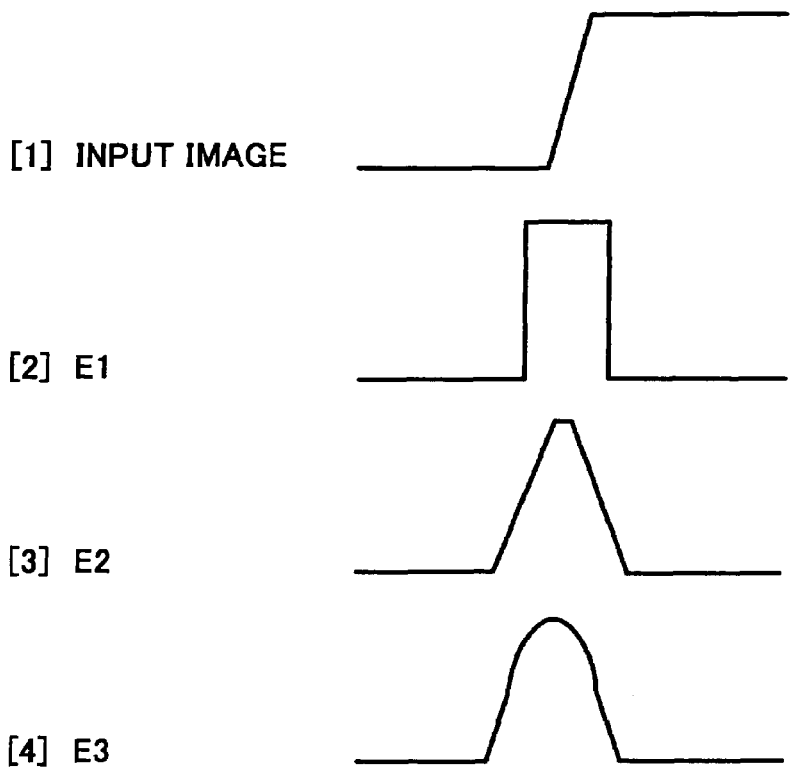
FIG. 10 shows a third characteristic relating to a second embodiment.

A second embodiment relates to the way of calculating the third characteristic. FIG. 10 shows how the first to the third characteristics are calculated in the second embodiment. [4] shows the third characteristic E3 relating to the second embodiment. The third characteristic E3 is detected from the first characteristic E1 and the second characteristic E2 based on the following expression. Moreover, E2=E2' (refer to FIG. 5). E2 may be a signal after the expansion processing.

$$E3=(\alpha \times E1+\beta \times E2)/(\alpha+\beta), \alpha \geq \beta$$

where α and β are parameters of weighting. When α=β, E3 becomes an average value of the characteristics E1 and E2. The parameters α and β are adjusted to such an extent that the characteristic E3 does not bring about a jump of a large value. While this adjustment has been made to the second characteristic in the first embodiment, it is also effective to devise the detection method at a stage of detecting the third characteristic like in the second embodiment.

Figure 11:
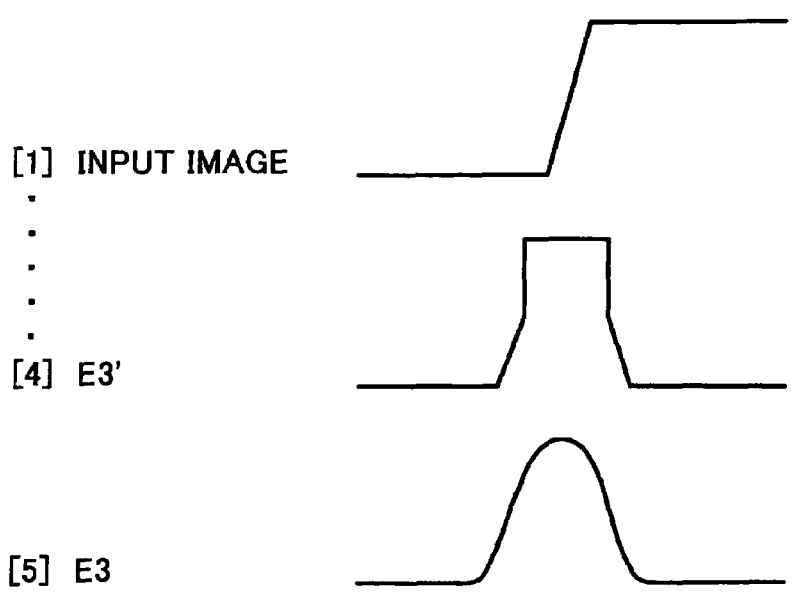
FIG. 11 shows a third characteristic relating to a third embodiment.

A third embodiment also relates to the way of calculating the third characteristic. FIG. 11 shows how the third characteristic is calculated in the third embodiment. [5] shows the third characteristic E3 relating to the third embodiment. In FIG. 11, E3' of [4] is the same as the signal E3' of [4] shown in FIG. 7.

In the third embodiment, the characteristic E3' is first generated from the first characteristic E1 and the second characteristic E2. The third characteristic E3 is generated from the characteristic E3'. It is possible to detect the third characteristic by masking E3' with a smoothing filter shown in FIG. 12. A parameter and a size of the smoothing filter are suitably adjusted to prevent E3 from bringing about a jump of a large value. It is also effective to process the third characteristic after it has been once detected like in the third embodiment.

A fourth embodiment also relates to the way of calculating the third characteristic. FIG. 13 shows how the third characteristic is calculated. In FIG. 13, [4]-1 and [4]-2 show a third characteristic E3 relating to the third embodiment.

The characteristic E3 shown in [4]-1 is generated from the first characteristic E1. The characteristic E3 changes smoothly according to a distance from pixels having the first characteristic as E1=1. The characteristic may be generated by actually calculating the distance. It is also possible to obtain the characteristic having a shape as shown in [4]-1 by detecting the edge from a signal after the first characteristic E1 has been expanded.

The second characteristic E2 is used in another mode. Many copying machines have a function that a user selects a type of draft on a console panel, and the copying machines process images in the mode corresponding to the selected type of draft. There are also copying machines that carry out a pre-scanning to automatically recognize a type of draft, and select a mode based on this recognition. When there are a character/photograph mode and a photograph mode, for example, the characteristic of [4]-1 is used in the character/photograph mode, and the characteristic of [4]-2 where E3=E2 is used in the photograph mode. In this way, a soft multi-stage control is carried out. It is also effective to prepare the third characteristic from the first characteristic like in the fourth embodiment.

Figure 14:
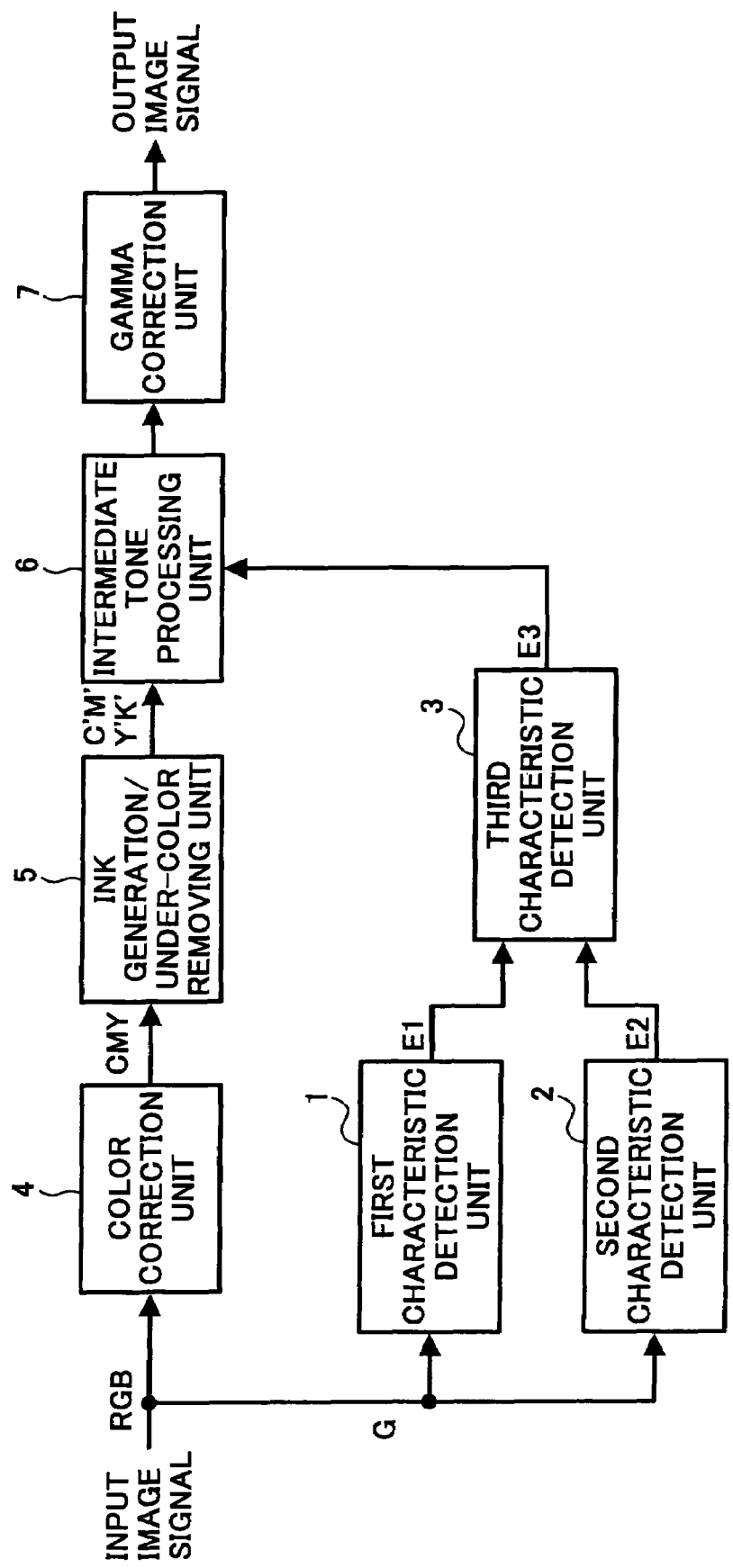
FIG. 14 shows a block diagram of the device according to a fifth embodiment of the present invention.

FIG. 14 shows a block diagram of the device according to a fifth embodiment of the present invention. The overall configuration is same as the one shown and explained in connection to the first embodiment. In the fifth embodiment, an intermediate tone processing unit 6 is controlled at multi-stages by using the third characteristic E3. The intermediate tone processing unit 6 performs an intermediate tone processing.

It is assumed that as an intermediate tone processing to be applied, there is employed a structure in which a 2×1 ten-thousand line dithering method is used to carry out a pseudo intermediate tone processing for a gradation image, and a 1×1 dithering method is used to carry out a pseudo intermediate tone processing for a character image. In the intermediate area between the two, the processing between 2×1 and 1×1 is suitably carried out according to the edge. In this case, as a multi-stage control of the intermediate tone processing of the present invention, the 2×1 ten-thousand line dithering method is used to carry out a pseudo intermediate tone processing, when E3=0. The 1×1 dithering method is used to carry out a pseudo intermediate tone processing when E3=255. An intermediate multi-stage control is carried out when 0<E3<255.

As explained above, according to the fifth embodiment, when the third characteristic is applied to the intermediate tone processing, it is possible to obtain both the effect of the binary information that a sufficient sharpness is obtained at the character edge and the effect of the multi-value information that there is no disturbance in the texture due to changeover of processing.

Figure 15:
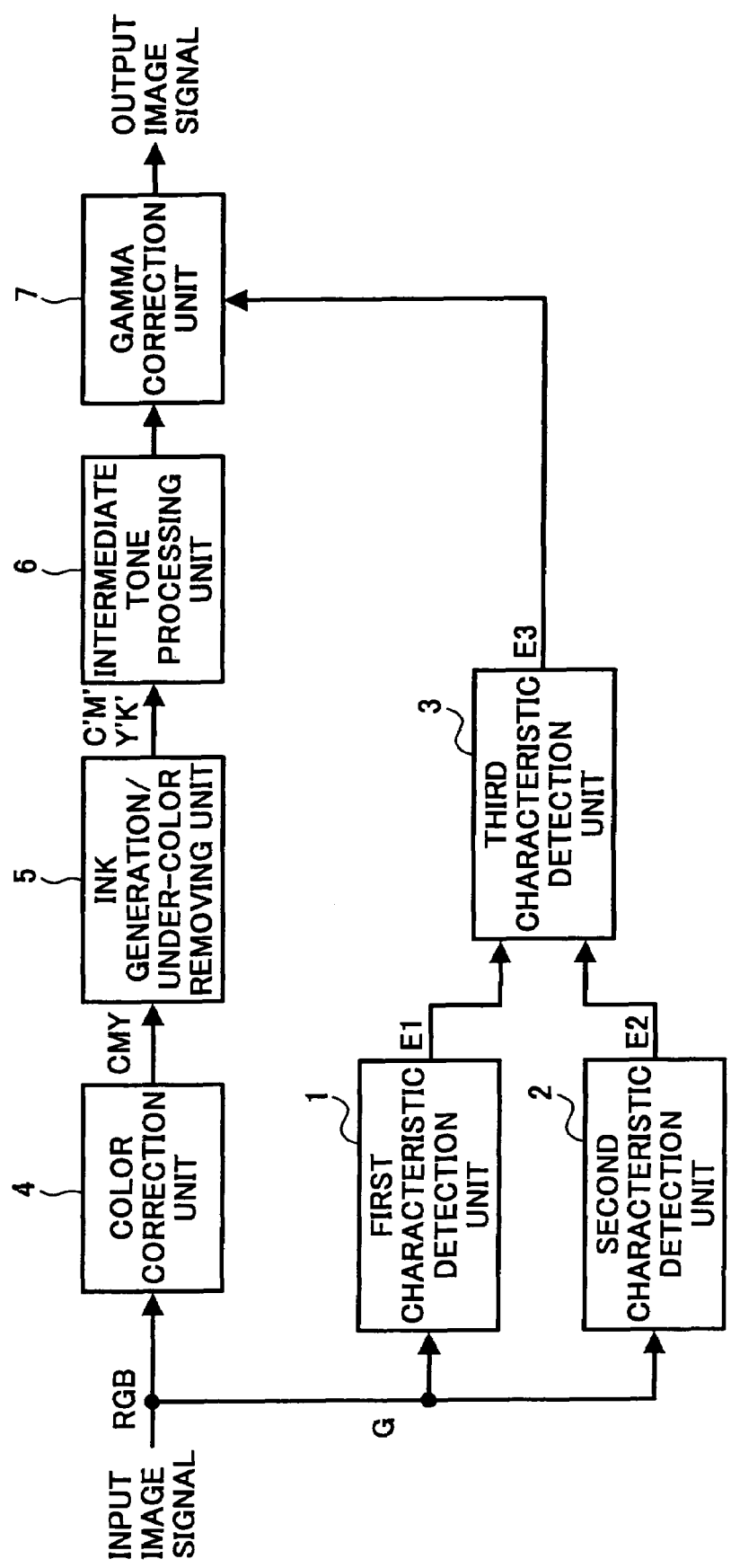
FIG. 15 shows a block diagram of the device according to a sixth embodiment of the present invention.

FIG. 15 shows a block diagram of the device according to a sixth embodiment of the present invention. The overall configuration is same as the one shown and explained in connection to the first embodiment. In the sixth embodiment, a gamma correction unit 7 is controlled at multi-stages by using a third characteristic E3. The gamma correction unit 7 performs the γ correction.

As adaptive correction, a γ correction table having a smooth shape is prepared for gradation correction. A γ correction table having a steep shape is prepared for character processing. In the intermediate area between the two, an intermediate shape table having a plurality of stages is prepared. Any one of the tables is selected according to the edge. In the multi-stage control of gamma correction according to the present invention, the γ correction table having a smoothest shape is selected when E3=0. The γ correction table having a steepest shape is selected when E3=255. An intermediate correction table is selected when 0<E3<255. In this way, the gamma correction is controlled at multi-stages.

As explained above, according to the sixth embodiment, when the third characteristic is applied to the gamma correction, it is possible to obtain both the effect of the binary information that a sufficient contrast is secured at the character edge and the effect of the multi-value information that an unnatural edging dose not occur at the character edge due to changeover of processing.

As explained above, according to the present invention, it is possible to obtain the following effects:

(1) A third characteristic is detected as approximately N value information, based on a first characteristic as binary information and a second characteristic as N (N>2) value information. A predetermined processing is controlled based on the third characteristic. Therefore, it is possible to obtain both the image quality effect according to the binary control and the image quality effect according to the multi-value control. As a result, it is possible to reproduce an image of high quality.

(2) At the time of detecting a third characteristic, a first characteristic is selected with priority. Therefore, it is possible to achieve the object of the present invention without losing the image quality effect according to the binary information.

(3) A character is detected at the edge, and the processing is controlled according to the characteristic. Therefore, it is possible to improve the image quality at the character edge.

(4) A third characteristic is exhibited at multi-stages inside the character edge. Therefore, it is possible to obtain the effect of the multi-value control that a defect is restricted.

(5) By applying a third characteristic to the ink generation and the under-color removal, it is possible to obtain both the effect of the binary information that coloring is restricted and the effect of the multi-value information that the occurrence of a crack is restricted.

(6) When a third characteristic is applied to the intermediate tone processing, it is possible to obtain both the effect of the binary information that a sufficient sharpness is obtained at the character edge and the effect of the multi-value information that there is no disturbance in the texture due to changeover of processing.

(7) When a third characteristic is applied to the gamma correction, it is possible to obtain both the effect of the binary information that a sufficient contrast is secured at the character edge and the effect of the multi-value information that an unnatural edging dose not occur at the character edge due to changeover of processing.

The present document incorporates by reference the entire contents of Japanese priority document, 2001-289913 filed in Japan on Sep. 21, 2001.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus comprising:
a first characteristic detection unit that detects an edge area as binary information from an image;
a second characteristic detection unit that detects an edge amount as N value information, where N is an integer greater than two, from the image;
a third characteristic detection unit that selects the edge area as a third characteristic when the first characteristic detection unit detects the edge area, and selects the edge amount detected by the second characteristic detection unit as the third characteristic when the first characteristic detection unit does not detect the edge area; and
a control unit that provides a control to perform a specified processing to the image using the third characteristic,
wherein the third characteristic takes a maximum value of the edge amount when the third characteristic detection unit has selected the first characteristic, and
wherein the third characteristic is detected from the first characteristic and the second characteristic based on the following expression, $$E3=(\alpha \times E1+\beta \times E2)/(\alpha+\beta), \alpha \geq \beta$$

where E1 represents the first characteristic, E2 represents the second characteristic and E3 represents the third characteristic, and $\alpha$ and $\beta$ are parameters of weighting, and wherein E3 becomes an average value of the characteristics E1 and E2 when $\alpha=\beta$.

2. The image processing apparatus according to claim 1, wherein said first characteristic detection unit and said second characteristic detection unit are configured to detect characteristics using only a Max (R, G, B) signal of said image.

3. The image processing apparatus according to claim 1, wherein the specified processing is any one of an ink generation processing, an under-color removal processing, a pseudo intermediate tone processing, and a gamma correction processing.

4. The image processing apparatus according to claim 1, wherein the second characteristic is obtained by expanding a character calculated from a filtered image data.

5. An image processing apparatus comprising:
a first characteristic detection unit that detects a first characteristic as binary information from an image;
a second characteristic detection unit that detects a second characteristic from the image;
a third characteristic detection unit that detects a third characteristic based on the first characteristic and the second characteristic; and
a control unit that provides a control to perform a specified processing to the image using the third characteristic,
wherein the second characteristic is same as the first characteristic but is represented as N value information, where N is an integer equal to or greater than two, and said first characteristic detection unit and said second characteristic detection unit are configured to detect characteristics using only a Max(R, G, B) signal of said image, and
wherein the third characteristic is detected from the first characteristic and the second characteristic based on the following expression, $$E3=(\alpha \times E1+\beta \times E2)/(\alpha+\beta), \alpha \geq \beta$$

where E1 represents the first characteristic, E2 represents the second characteristic and E3 represents the third characteristic, and $\alpha$ and $\beta$ are parameters of weighting, and wherein E3 becomes an average value of the characteristics E1 and E2 when $\alpha=\beta$.

6. An image processing apparatus comprising:
an edge area detection unit that detects a first characteristic as binary information from an image;
an edge detection unit, said edge detection unit detects a second characteristic, said edge detection unit further comprising:
a plurality of edge detection filters; and
a maximum value selector to select a largest absolute value from the outputs of said edge detection filters and to output an edge as N value information, where N is an integer equal to or greater than two;
a characteristic detection unit that detects a third characteristic based on the first characteristic and the second characteristic; and
a control unit that provides a control to perform specified processing to the image using the third characteristic,
wherein said edge area detection unit and said edge detection unit are configured to detect said second characteristic using only a green signal of said image, and
wherein the third characteristic is detected from the first characteristic and the second characteristic based on the following expression, $$E3=(\alpha \times E1+\beta \times E2)/(\alpha+\beta), \alpha \geq \beta$$

where E1 represents the first characteristic, E2 represents the second characteristic and E3 represents the third characteristic, and $\alpha$ and $\beta$ are parameters of weighting, and wherein E3 becomes an average value of the characteristics E1 and E2 when $\alpha=\beta$.

7. An image processing apparatus comprising:

a first characteristic detection unit that detects an edge area as binary information from an image;

a second characteristic detection unit that detects an edge amount as N value information, where N is an integer greater than two, from the image;

a third characteristic detection unit that selects the edge area as a third characteristic when the first characteristic detection unit detects the edge area, and selects the edge amount detected by the second characteristic detection unit as the third characteristic when the first characteristic detection unit does not detect the edge area; and a control unit that provides a control to perform a specified processing to the image using the third characteristic, wherein the third characteristic takes a maximum value of the edge amount when the third characteristic detection unit has selected the first characteristic, and wherein the third characteristic is generated from the first characteristic by selecting one of two modes, one of said two modes calculates distance from pixels having the first characteristic as $E1=1$ and another of said two modes detects the edge from a signal after expanding the first characteristic, where $E1$ represents the first characteristic.

* * * * *